United States Patent
Lee et al.

(10) Patent No.: US 10,529,959 B2
(45) Date of Patent: Jan. 7, 2020

(54) BATTERY CELL HAVING IMPROVED INSULATION PERFORMANCE OF ELECTRODE LEAD WHILE HAVING EXCELLENT MANUFACTURING PROCESSABILITY BASED ON STANDARDIZED STRUCTURE AND BATTERY PACK INCLUDING THE SAME

(71) Applicant: LG CHEM, LTD., Seoul (KR)

(72) Inventors: Hyun Jong Lee, Daejeon (KR); Dong Hyun Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 46 days.

(21) Appl. No.: 15/754,404

(22) PCT Filed: Mar. 24, 2017

(86) PCT No.: PCT/KR2017/003160
§ 371 (c)(1),
(2) Date: Feb. 22, 2018

(87) PCT Pub. No.: WO2017/188605
PCT Pub. Date: Nov. 2, 2017

(65) Prior Publication Data
US 2018/0269435 A1 Sep. 20, 2018

(30) Foreign Application Priority Data

Apr. 25, 2016 (KR) .................. 10-2016-0050383

(51) Int. Cl.
*H01M 2/00* (2006.01)
*H01M 2/02* (2006.01)
(Continued)

(52) U.S. Cl.
CPC ........... *H01M 2/029* (2013.01); *H01M 2/026* (2013.01); *H01M 2/0277* (2013.01); *H01M 2/26* (2013.01);
(Continued)

(58) Field of Classification Search
CPC ........ H01M 2/021; H01M 2/028; H01M 2/06; H01M 2/204; H01M 2/1022
See application file for complete search history.

(56) References Cited

U.S. PATENT DOCUMENTS 9,123,476 B2 9/2015 Hata et al.
2004/0121231 A1 6/2004 Kim
(Continued)

FOREIGN PATENT DOCUMENTS

EP 1 734 597 A1 12/2006
EP 2 052 431 B1 11/2012
(Continued)

OTHER PUBLICATIONS

European Search Report for Appl. No. 17789790.7 dated Jul. 3, 2018.
(Continued)

*Primary Examiner* — Cynthia H Kelly
*Assistant Examiner* — Monique M Wills
(74) *Attorney, Agent, or Firm* — Birch, Stewart, Kolasch & Birch, LLP

(57) ABSTRACT

A battery cell has a structure in which outer peripheral portions of a battery case are sealed by thermal bonding in a state in which an electrode assembly is mounted together with an electrolyte in a battery case made of a laminate sheet, wherein a pair of electrode leads of the electrode assembly protrude outward from the battery case, and an
(Continued)

insulating member is attached to each of the electrode leads in an area of at least 60% of a total area of the electrode leads that protrude outwardly.

14 Claims, 7 Drawing Sheets

(51) Int. Cl.
    *H01M 2/26*     (2006.01)
    *H01M 10/0525*     (2010.01)
    *H01M 10/058*     (2010.01)
    *H01M 2/08*     (2006.01)

(52) U.S. Cl.
    CPC ..... *H01M 10/058* (2013.01); *H01M 10/0525* (2013.01); *H01M 2/08* (2013.01); *H01M 2220/30* (2013.01)

(56) References Cited

U.S. PATENT DOCUMENTS

| | | | |
|---|---|---|---|
| 2006/0286452 A1 | 12/2006 | Takamatsu | |
| 2010/0047687 A1 | 2/2010 | Lee et al. | |
| 2012/0231300 A1* | 9/2012 | Park | H01M 10/425 |
| | | | 429/7 |
| 2013/0029214 A1* | 1/2013 | Tamura | H01M 2/06 |
| | | | 429/179 |
| 2014/0072869 A1 | 3/2014 | Hata et al. | |
| 2015/0072185 A1* | 3/2015 | Cho | H01M 2/30 |
| | | | 429/56 |
| 2018/0090737 A1 | 3/2018 | Sawanishi et al. | |

FOREIGN PATENT DOCUMENTS

| | | |
|---|---|---|
| JP | 2003-123710 A | 4/2003 |
| JP | 2010-003485 A | 1/2010 |
| JP | 2011-151030 A | 8/2011 |
| JP | 2014-135169 A | 7/2014 |
| KR | 10-2004-0054128 A | 6/2004 |
| KR | 10-2007-0108751 A | 11/2007 |
| KR | 10-2008-0090769 A | 10/2008 |
| KR | 10-2010-0093986 A | 8/2010 |
| KR | 10-2013-0070624 A | 6/2013 |
| KR | 10-2013-0099860 A | 9/2013 |
| KR | 10-2015-033281 A | 4/2015 |
| WO | WO 2016/157370 A1 | 10/2016 |

OTHER PUBLICATIONS

International Search Report for PCT/KR2017/003160 (PCT/ISA/210) dated Jun. 20, 2017.

* cited by examiner

BATTERY CELL HAVING IMPROVED INSULATION PERFORMANCE OF ELECTRODE LEAD WHILE HAVING EXCELLENT MANUFACTURING PROCESSABILITY BASED ON STANDARDIZED STRUCTURE AND BATTERY PACK INCLUDING THE SAME

TECHNICAL FIELD

This application claims priority to and the benefit of Korean Patent Application No. 10-2016-0050383 filed in the Korean Intellectual Property Office on Apr. 25, 2016, the entire contents of which are incorporated herein by reference.

The present invention relates to a battery cell having improved insulation performance of an electrode lead while having excellent manufacturing processability based on a standardized structure and a battery pack including the same.

BACKGROUND ART

A lithium secondary battery is roughly classified into a cylindrical battery cell, a prismatic battery cell, a pouch type battery cell, and the like, depending on an exterior thereof, and is also classified into a lithium ion battery, a lithium ion polymer battery, a lithium polymer battery, and the like, depending on a form of an electrolyte thereof.

In accordance with the recent trend toward miniaturization of mobile devices, the demand for a prismatic battery and a pouch type battery cell having a thin thickness has increased. Particularly, a pouch type battery cell of which a shape may be easily changed, manufacturing cost is cheap, and a weight is small has been highly spotlighted.

In general, the pouch type battery cell indicates a battery in which an electrode assembly and an electrolyte are sealed in a pouch type case made of a laminate sheet including a resin layer and a metal layer.

FIG. 1 schematically illustrates a structure of a battery cell including a stack type electrode assembly.

Referring to FIG. 1, a battery cell 10 has a structure in which an electrode assembly 30 including a cathode, an anode, and a solid electrolyte coating separator disposed therebetween is sealed in a pouch type battery case 20 so that two electrode leads 40 and 41 electrically connected to cathode and anode tabs 31 and 32 of the electrode assembly 30 are exposed in parallel with each other.

The battery case 20 includes a case body 21 including a concave accommodation part 23 on which the electrode assembly 30 may be seated and a flat plate cover 22 integrally connected to the case body 21.

The battery case 20 is made of a laminate sheet, and includes an outer resin layer 20a forming an outermost portion, a blocking metal layer 20b preventing penetration of a material, and an inner resin layer 20c for sealing.

In the stack type electrode assembly 30, a plurality of cathode tabs 31 and a plurality of anode tabs 32 are each fused and bonded together to the electrode leads 40 and 41. Further, in order to prevent a short-circuit from occurring between a thermal bonding device and electrode leads 41 and 41 and secure sealing performance between the electrode leads 40 and 41 and the battery case 20 when an upper end portion 24 of the case body 21 and an upper end portion of the cover 22 are thermally bonded to each other by the thermal bonding device (not illustrated), an insulating film 50 is attached to upper and lower surfaces of the electrode leads 40 and 41.

Since the battery cell as described above generally has a planar structure, it is easy to stack a plurality of battery cells, and it is easy to bond leads to each other based on electrode leads having a protrusion structure. Therefore, a plurality of battery cells are stacked and connected to each other to thereby be used as a battery pack structure.

In relation to this, FIG. 2 is a schematic side view illustrating an example of a battery pack.

First, a battery cell 10 generally has a shape corresponding to an exterior of an electrode assembly 30. More specifically, based on a flat plate cover 22 of a battery case 20 forming an upper surface a of the battery cell 10, an accommodation part 23 is formed downwardly, the accommodation part 23 corresponding to a shape of the electrode assembly 30 and side surfaces of the battery cell 10 form a lower surface b, and a pair of electrode leads 40 and 41 protrude outwardly from the battery case in parallel with each other in a shape in which the electrode leads 40 and 41 and the flat plate cover form a straight line based on a cross section of the battery cell. The electrode leads are electrically connected to each other in a state in which a plurality of battery cells as described above are stacked upward based on the ground, thereby forming a single pack structure.

In a structure in which the battery cells are connected in series to each other as illustrated in FIG. 2, since electrode leads 41 and 40' of the battery cells 10 and 10' stacked in a state in which upper surfaces a and a' of the battery cells 10 and 10' face each other are adjacent to each other, it may be difficult to maintain an insulation state between the electrode leads 40' and 41 that should not be connected to each other for configuring a serial circuit.

Therefore, a structure in which battery cells of which upper surfaces a and a' face each other are spaced apart from each other to have an interval therebetween may be considered, but this structure may increase a volume of a battery pack 90.

Unlike this, in the case of additionally mounting a member 92 such as an insulating sheet or pad for preventing a contact between the electrode leads 40' and 41, a cost may be increased and a mounting process may be added, such that an entire manufacturing process may be complicated.

Further, even in the case of changing structures of some of the battery cells for insulation, equipment for manufacturing the battery cell having the changed structure should be additionally added, which is inefficient in view of manufacturing process.

Therefore, there is a high need for a battery cell having a structure with high insulation reliability of electrode leads while being standardized in a range in which manufacturing processability is not inhibited, and a battery pack including the same.

DISCLOSURE

Technical Problem

The present invention has been made in an effort to provide a battery cell having advantages of solving the problem in the related art and technical problems required to be solved from the past.

The present invention has been made in an effort to provide a battery cell having advantages of having high insulation reliability of electrode leads based on a structure in which an insulating member is attached to each of the electrode leads, and having excellent manufacturing processability by being standardized in this structure, and a battery pack including the same.

Technical Solution

An exemplary embodiment of the present invention provides a battery cell having a structure in which outer peripheral portions of a battery case are sealed by thermal bonding in a state in which an electrode assembly is mounted together with an electrolyte in a battery case made of a laminate sheet, wherein a pair of electrode leads of the electrode assembly protrude outward from the battery case, and an insulating member is attached to each of the electrode leads in an area of at least 60% of a total area of the electrode leads that protrude outwardly.

That is, since the insulating member is attached in a relatively wide area as compared to the electrode leads exposed to the outside, the battery cell according to the present invention may have a structure having high insulation reliability.

The electrode leads having a protruding shape may be bonded to a protective circuit board or electrode leads of another battery cell by a welding method or mechanical fastening method in a shape in which the electrode leads come in contact with the protective circuit board or the electrode leads of another battery.

It is preferable that the electrode lead is partially exposed to the outside for electrical connection corresponding to an original function of the electrode lead, but there is a need to set an exposure degree of the electrode lead in a range in which insulation reliability may also be secured. Therefore, in the present invention, the electrode lead may have a structure in which the insulating member is not attached to 10 to 40% of portions of the electrode lead exposed to the outside.

The electrode lead having the above-mentioned structure may be electrically connected to the outside through a significantly restrictive portion, that is, the rest portion of the electrode lead to which the insulating member is not attached, and at the same time, portions except for the restrictive portion may be insulated by the insulating member, such that undesired electrical connection of the electrode lead may be blocked.

When a ratio of the portion in which the insulating layer is not attached is less than 10%, welding or mechanical fastening of the electrode lead may not be easy, and when the ratio of the portion in which the insulating layer is not attached is more than 40%, it is impossible to secure insulation reliability of the electrode lead, which is not preferable.

As a specific example, the battery case may be a pouch type battery case made of a laminate sheet including a resin layer and a metal layer.

The laminate sheet may have a structure in which an outer resin layer having excellent durability is attached to one surface (outer surface) of a metal blocking layer, and a heat-meltable resin sealant layer is attached to the other surface (inner surface) thereof.

Since the outer resin layer needs to have high resistance against an external environment, the outer resin layer needs to have more than predetermined tensile strength and weather resistance. In this regard, as a polymer resin of the outer resin layer, a polyethylene terephthalate (PET) or oriented nylon film may be used.

The metal blocking layer may be made of aluminum so as to exhibit a function of increasing strength of a cell case in addition to a function of preventing introduction or leakage of foreign materials such as gas, moisture, and the like.

As a polymer resin of the resin sealant layer, a polyolefin based resin which exhibits a high thermal bonding property (thermal adhesive property) and a low hygroscopic property, which is necessary to restrain permeation of an electrolyte, and is not expanded or is not corroded by the electrolyte may be preferably used. More specifically, cast polypropylene (CPP) may be used.

Since the polyolefin based resin, such as polypropylene, generally has low adhesion with a metal, in order to improve adhesion with the metal blocking layer, an adhesion layer may be further disposed between the resin sealant layer and the metal layer, thereby improving adhesion and blocking characteristics. Examples of a material of the adhesive layer may include a urethane based material, an acrylic material, a composition containing a thermoplastic elastomer, and the like, but are not limited thereto.

The battery case may also include a case body in which an accommodation part is formed to accommodate the electrode assembly therein and a flat plate cover extended from one end portion of the case body or made of a member independent from the case body, wherein the flat plate cover forms an upper surface of the battery cell and the electrode leads protrude outwardly from the battery case in a shape in which the electrode leads and the flat plate cover form a straight line based on the cross section of the battery cell.

In this structure, the upper surface of the battery cell is formed in a flat plate shape, such that there is an advantage in that at the time of stacking the battery cells using upper surfaces thereof, it is possible to secure high dimensional stability.

The battery cell may have a structure in which the pair of electrode leads protrude in parallel with each other from the same outer peripheral portion of the battery case; or a structure in which the pair of electrode leads protrude from outer peripheral portions of the battery case opposing each other, respectively.

Particularly, since in the structure in which the pair of electrode leads protrude in parallel from the same outer peripheral portion of the battery case, electrical connection through the electrode leads is performed only in one portion of the battery cell, this structure has an advantage in view of space utilization.

However, in these structure, when a plurality of battery cells are stacked, the electrode leads are positioned to be significantly adjacent to each other in a vertical direction in a section in which upper surfaces of the battery cells are stacked, but all of the electrode leads adjacent to each other are not connected to each other.

Therefore, since it is essential to stably maintain an electrical insulation state between the electrode leads that are not connected to each other, there is a need to block electrical conduction between the electrode leads using an insulating material capable of restricting an electrically conductible area depending on a contact.

However, since significantly small portions of the electrode leads need to be blocked from electrical contacts, a method of changing a shape of the battery cell or performing additional processes in consideration of the electrical contacts is disadvantageous in view of manufacturing cost and manufacturing time.

Therefore, the battery cell according to the present invention is standardized so as to satisfy insulation performance required in only some of electrode leads while enabling electrical connection corresponding to an original function of the electrode leads based on the above-mentioned structure, that is, the structure in which the insulating material is added to the rest portions of the electrode leads that protrude outwardly so that only significantly restrictive surfaces thereof are exposed, even without changing the shape of the battery cell and performing additional processes, such that the battery cell is significantly advantageous in view of manufacturing processability.

As a specific example, the insulating member may be an insulating film attached to both surfaces of the electrode lead.

The insulating film may protrude outwardly from the battery case together with electrode lead in a structure in which the insulating film partially encloses a surface of the electrode lead, and the rest portion of the insulating film except for a portion of the insulating film protruding together with the electrode lead may be thermally bonded to a contact surface of the battery case.

The insulating film may protrude from the battery case at a length corresponding to 60 to 90% of a total length of the electrode lead that protrudes outwardly.

When a ratio of the length of the insulating film to the total length of the electrode lead is less than 60%, it is impossible to secure insulation reliability of the electrode lead, which is not preferable, and when the ratio is more than 90%, welding or mechanical fastening of the electrode lead may not be easy, which is not preferable.

The insulating film may also include at least one polymer resin layer and an adhesive layer formed on one surface of the resin layer.

A material of the polymer resin layer is not particularly limited as long as it has an insulating property and a thermal bonding property (thermal adhesive property). In detail, a cast polypropylene (CPP) based resin which has excellent insulating and thermal bonding properties and a low hygroscopic property in order to restrain permeation of an electrolyte, and is not expanded or is not corroded by the electrolyte may be used.

The polymer resin layer may be formed at a thickness of 45 to 100 μm. The thickness of the polymer resin layer is excessively thin, which is not preferable in that physical properties of the resin are deteriorated, and the thickness is excessively thick, which is not preferable in that attachment strength may be deteriorated due to large tension operating at the time of thermal contraction.

As a specific example, an embossing structure may be formed on the other surface of the polymer resin layer on which the adhesive layer is not formed.

This embossing structure may be a structure in which a plurality of protrusions integrated with the polymer resin layer are formed on the surface, and the protrusions may maintain an interval between the electrode lead and an external object by a size of the protrusions at the time of coming in contact with the external object.

That is, the insulating film has a structure additionally preventing an undesired contact of the electrode lead based on the embossing structure.

To this end, a ratio of a protrusion height of the protrusions to the thickness of the polymer resin layer may be 100% to 1000%. When the ratio is less than 100%, it is impossible to achieve an effect of maintaining an interval, and when the ratio is more than 1000%, it is impossible to maintain a protrusion shape of the protrusions on the polymer resin layer, which is not preferable.

The embossing structure may be formed only on the rest portion of the polymer resin layer except for portions of the polymer resin layer thermally bonded to the battery case so as not to deteriorate a degree of thermal bonding between the insulating film and the battery case. In detail, the embossing structure may be formed on a portion of the polymer resin layer protruding outwardly together with the electrode lead except for a portion of the polymer resin layer thermally bonded to the contact surface of the battery case.

The protrusion forming the embossing structure may be made of the same material configuring the polymer resin layer.

A material of the adhesive layer is not particularly limited as long as it does not react with the electrolyte in the battery cell and imparts adhesion. For example, the adhesive layer may be made of an acrylic resin.

The electrode lead may be electrically connected to the outside through the rest portion thereof to which the insulating film is not attached. Here, the outside means an object capable of electrically interacting with the electrode lead such as a protective circuit board, an electrode lead of the battery cell, or the like.

Here, the battery cell may include at least one shape selected from, (a) a shape in which only the rest portion of the electrode lead to which the insulating film is not attached is perpendicularly bent in a protrusion direction of the electrode lead, (b) a shape in which the electrode lead is perpendicularly bent together with the insulating film, and (c) a shape in which the rest portion of the electrode lead to which the insulating film is not attached and the insulating film form a straight line based on a cross section of the battery cell.

Meanwhile, the kind of battery cell is not particularly limited, but as a specific example, the battery cell may be a lithium secondary battery such as a lithium (Li)-ion secondary battery, a lithium (Li)-polymer secondary battery, or a lithium (Li)-ion polymer secondary battery, having advantages such as high energy density and discharge voltage, output stability, and the like.

Generally, the lithium secondary battery includes a cathode, an anode, a separator, and a lithium salt-containing non-aqueous electrolyte.

The cathode may be prepared, for example, by applying a mixture of a cathode active material, a conductive material, and a binder on a cathode current collector and/or an extended current collector, and then drying the applied mixture, and if necessary, a filler may be further added to the mixture.

Generally, the cathode current collector and/or the extended current collector may be formed at a thickness of 3 to 500 μm. A material of the cathode current collector and/or the extended current collector is not particularly limited as long as it does not cause chemical changes in the battery and has high conductivity. For example, stainless steel, aluminum, nickel, titanium, baked carbon, or a material obtained by surface treating an aluminum or stainless steel surface with carbon, nickel, titanium, silver, or the like, may be used. Micro unevenness may be formed on surfaces of the cathode current collector and/or the extended current collector, thereby making it possible to improve adhesion of the cathode active material. Further, the cathode current collector and/or the extended current collector may be used in various forms including films, sheets, foils, nets, porous bodies, foams, non-woven fabrics, and the like.

Examples of the cathode active material may include layered compounds such as lithium cobalt oxide ($LiCoO_2$) and lithium nickel oxide ($LiNiO_2$), or compounds substituted with one or more transition metals; lithium manganese oxides such as compounds represented by Chemical Formula $Li_{1+x}Mn_{2-x}O_4$ (here, x is in a range of 0 to 0.33), $LiMnO_3$, $LiMn_2O_3$, and $LiMnO_2$; lithium copper oxide ($Li_2CuO_2$); vanadium oxides such as $LiV_3O_8$, $LiFe_3O_4$, $V_2O_5$ and $Cu_2V_2O_7$; Ni-site type lithium nickel oxides represented by Chemical Formula $LiNi_{1-x}M_xO_2$ (here, M is Co, Mn, Al, Cu, Fe, Mg, B, or Ga, and x is in a range of 0.01 to 0.3); lithium manganese composite oxides represented by Chemical Formula $LiMn_{2-x}M_xO_2$ (here, M is Co, Ni, Fe, Cr, Zn, or Ta, and x is in a range of 0.01 to 0.1), or Chemical Formula $Li_2Mn_3MO_8$ (here, M is Fe, Co, Ni, Cu, or Zn); $LiMn_2O_4$ wherein a portion of Li is substituted with alkaline earth metal ions; disulfide compounds; $Fe_2(MoO_4)_3$, and the like, but are not limited thereto.

Generally, the conductive material may be added in a range of 1 to 30 wt % based on a total weigh of the mixture containing the cathode active material. Any conductive material may be used without particular limitation as long as it has conductivity without causing chemical changes in the battery. Examples of the conductive material may include graphite such as natural graphite or artificial graphite; carbon blacks such as carbon black, acetylene black, Ketjen black, channel black, furnace black, lamp black, and thermal black; conductive fibers such as carbon fibers and metallic fibers; metallic powders such as carbon fluoride powders, aluminum powders, and nickel powders; conductive whiskers such as zinc oxide and potassium titanate; conductive metal oxides such as titanium oxide; and conductive materials such as polyphenylene derivatives, and the like.

The binder, which is a component assisting in binding between an active material, a conductive material, and the like, and in binding with a current collector, may be generally added in an amount of 1 to 30 wt %, based on the total weight of the mixture containing the cathode active material. Examples of the binder as described above may include polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene-butylene rubber, fluorine rubber, various copolymers, and the like.

The filler, which is a component suppressing expansion of a cathode, may be selectively used, and is not particularly limited as long as it does not cause chemical changes in the battery and is a fibrous material. Examples of the filler may include olefin based polymers such as polyethylene and polypropylene; and fibrous materials such as glass fiber and carbon fiber.

The anode may be prepared by applying an anode active material onto an anode current collector and/or extended current collector and then drying the applied anode active material, and if necessary, the above-mentioned components may be selectively and additionally contained in the anode.

Generally, the anode current collector and/or the extended current collector may be formed at a thickness of 3 to 500 μm. A material of the anode current collector and/or the extended current collector is not particularly limited as long as it does not cause chemical changes in the battery and has high conductivity. For example, copper, stainless steel, aluminum, nickel, titanium, baked carbon, or a material obtained by surface treating a copper or stainless steel surface with carbon, nickel, titanium, silver, an aluminum-cadmium alloy, or the like, may be used. Further, similarly to the cathode current collector, micro unevenness may be formed on surfaces of the anode current collector, thereby making it possible to improve adhesion of the anode active material. Further, the anode current collector may be used in various forms including films, sheets, foils, nets, porous bodies, foams, non-woven fabrics, and the like.

Examples of the anode active material may include carbon such as hard carbon and graphite based carbon; metal composite oxides such as $Li_xFe_2O_3$ (0≤x≤1), $Li_xWO_2$ (0≤x≤1), $Sn_xMe_{1-x}Me'_yO_z$ (Me: Mn, Fe, Pb, or Ge; Me': Al, B, P, Si, Group I, II and III elements of the Periodic Table, or halogens; 0<x≤1; 1≤y≤3; and 1≤z≤8); a lithium metal; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; Li—Co—Ni based materials, and the like.

The separator is interposed between the cathode and the anode, and an insulating thin film having high ion permeability and mechanical strength may be used. Generally, the separator may have a pore diameter of 0.01 to 10 μm and a thickness of 5 to 300 μm. As the separator, sheets, non-woven fabrics, or the like, made of an olefin-based polymer such as polypropylene; glass fibers or polyethylene, or the like, which have chemical resistance and hydrophobicity, may be used. When a solid electrolyte such as a polymer is used as the electrolyte, the solid electrolyte may also serve as the separator.

The electrolyte may be a lithium salt-containing non-aqueous electrolyte, and include a non-aqueous electrolyte and a lithium salt. As the non-aqueous electrolyte, a non-aqueous organic solvent, an organic solid electrolyte, an inorganic solid electrolyte, or the like, is used, but the non-aqueous electrolyte is not limited thereto.

Examples of the non-aqueous organic solvent may include aprotic organic solvents such as N-methyl-2-pyrrolidone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, and the like.

Examples of the organic solid electrolyte may include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, polymers containing ionic dissociation groups, and the like.

Examples of the inorganic solid electrolyte may include nitrides, halides, and sulfates of Li, such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, and the like.

The lithium salt may be a material that is readily soluble in the non-aqueous electrolyte, and examples thereof may include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, imide, and the like.

Further, in order to improve charge/discharge characteristics, flame retardancy, and the like, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like, may be added to the non-aqueous electrolyte. In some cases, in order to impart incombustibility, the electrolyte may further include a halogen-containing solvent such as carbon tetrachloride and ethylene trifluoride, and in order to improve high-temperature storage characteristics, the electrolyte may further include carbon dioxide gas, and fluoro-ethylene carbonate (FEC), propene sultone (PRS), or the like.

As a specific example, the lithium salt-containing non-aqueous electrolyte may be prepared by adding a lithium salt such as $LiPF_6$, $LiClO_4$, $LiBF_4$, $LiN(SO_2CF_3)_2$, or the like, to a mixed solvent of a cyclic carbonate such as EC or PC as a highly dielectric solvent and a linear carbonate such as DEC, DMC, or EMC as a low viscosity solvent.

Another embodiment of the present invention provides a battery pack including the battery cell described above.

In detail, the battery pack according to the present invention is a battery pack in which n battery cells (n≥2) are connected in series and/or in parallel to each other, wherein the battery cells are stacked upwardly based on the ground in a state in which electrode leads of battery cells different from each other are positioned in parallel with each other in a vertical direction, and among the battery cells, at least one pair of the battery cells are stacked so that upper surfaces thereof face each other, and among the electrode leads of the battery cells stacked so that the upper surfaces thereof face each other, in electrode leads that are not connected to each other, an insulation state is maintained by insulating films attached to the electrode leads, respectively.

That is, the battery pack according to the present invention has a structure in which the insulating film significantly restricts contact electrical conduction of the electrode lead. Since the insulating film naturally blocks electrical conduction between electrode leads which should not come in contact with each other for configuring a circuit among the electrode leads that are essentially adjacent to each other because the battery cells are stacked so that upper surfaces thereof face each other, but the insulating film does not completely block contact electrical conduction of the electrode lead, the battery pack is configured so that an electrical connection structure may be achieved in a desired form through portions of the electrode leads in which electrical conduction may occur.

As described above, even though the battery pack is standardized so that this structure is not locally applied to some of the electrode leads of which insulation performance needs to be secured but is applied to all of the electrode leads, an electrical connection structure may also be configured in a desired form through portions of the electrode leads that are not insulated by the insulating film, such that the battery pack may have excellent manufacturing processability as compared to a battery pack in which in consideration of only some of the electrode leads, a shape of the electrode lead or an electrical connection structure is changed or an insulating material is added.

Yet another embodiment of the present invention provides a device including one or more battery packs described above.

MODE FOR INVENTION

Hereinafter, the present invention will be described with reference to the accompanying drawings according to exemplary embodiments of the present invention in order to allow the present invention to be more easily understood, but the scope of the present invention is not limited thereto.

Figure 3:
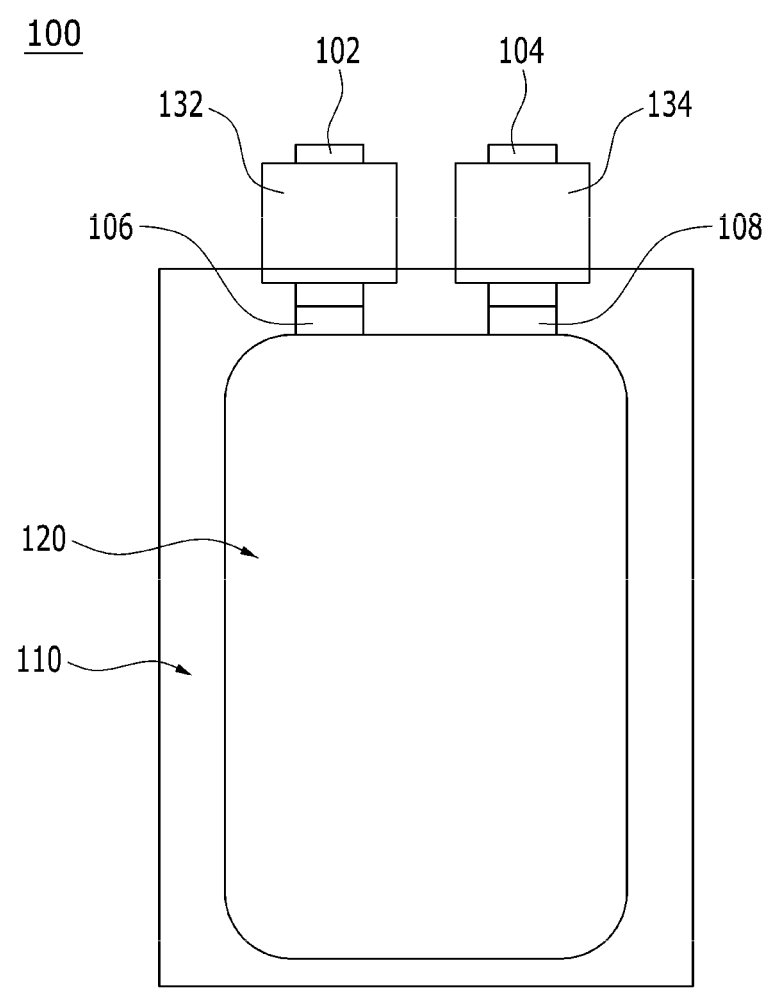
FIGS. 3 and 4 are schematic views of a battery cell according to an exemplary embodiment of the present invention.
Figure 4:
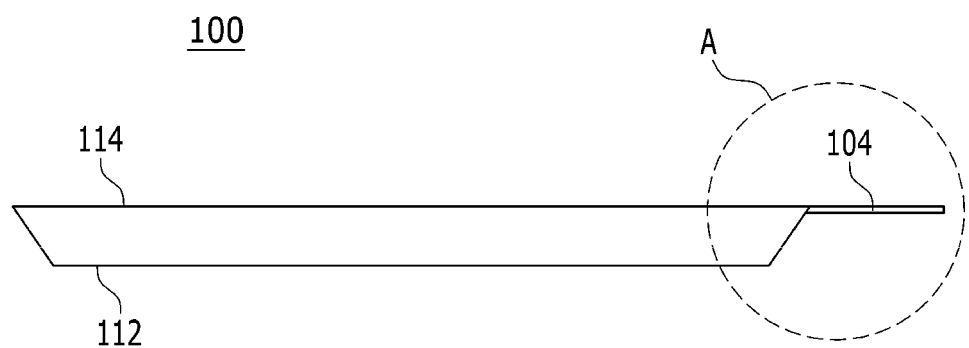

FIG. 3 is a schematic plan view of a battery cells according to an exemplary embodiment of the present invention, and FIG. 4 is a schematic side view of the battery cell of FIG. 3. In addition, FIG. 5 is an enlarged schematic view of a vertical cross section of part A of FIG. 4.

Figure 5:
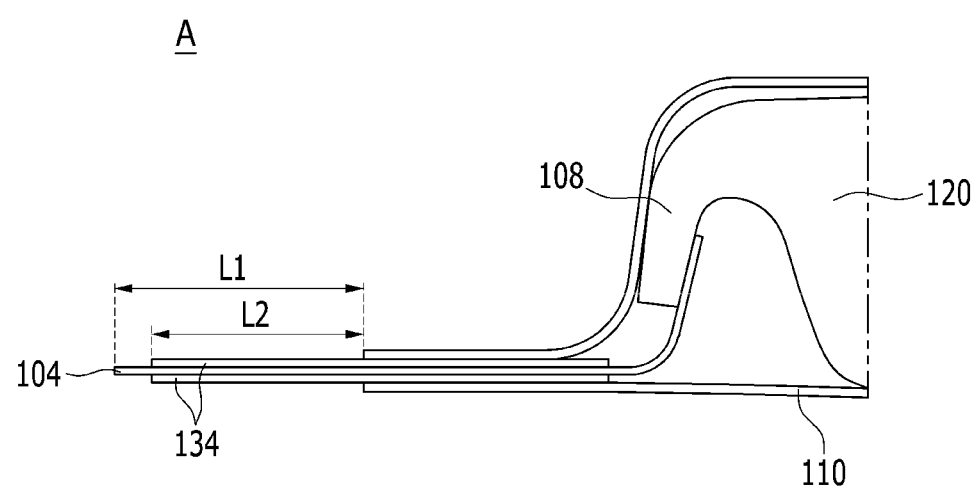
FIG. 5 is an enlarged schematic view of part A in FIG. 4.

Referring to FIGS. 3 to 5, a battery cell 100 has a structure in which a cathode lead 102 and an anode lead 104 of an electrode assembly 120 are mounted in a battery case 110 together with an electrolyte (not illustrated) in a state in which the cathode lead 102 and the anode lead 104 protrude outwardly from the battery case 110 through an outer peripheral portion of the battery case 110, and the electrode assembly 120 is sealed from the outside by thermally bonding outer peripheral portions of the battery case 110.

Here, the cathode lead 102 and the anode lead 104 protrudes in parallel with each other in the same outer peripheral portion of the battery case 110, and since the cathode lead 102 and the anode lead 104 are electrically connected to only one portion of the battery cell 100, the battery cell 100 has an advantage in view of space utilization.

The battery case 110 may include a case body 112 in which an accommodation part is formed to accommodate the electrode assembly 120 therein and a flat plate cover 114 extended from one end portion of the case body 112 or made of a member independent from the case body 112.

The flat plate cover 114 forms an upper surface of the battery cell 100, the case body 112 forms a lower surface of the battery cell, and the electrode leads 102 and 104 protrude outwardly from the battery case 110 in a form in which the electrode leads 102 and 104 form a straight line together with the flat plate cover 114, that is, the upper surface of the battery cell based on a cross section of the battery cell.

In this structure, the upper surface is formed to be flat, such that at the time of stacking the battery cell using the upper surface of the battery cell 100, it is possible to provide high dimensional stability.

Meanwhile, insulating films 132 and 134 are partially positioned inside the outer peripheral portion of the battery case 110 in a state in which they are attached to the electrode leads 102 and 104, and portions of insulating films 132 and 134 positioned inside the outer peripheral portion of the battery case 110 are thermally bonded together with the outer peripheral portion. The rest portions of the insulating films 132 and 134 except for these portions protrude outwardly from the battery case 110 together with the electrode leads 102 and 104.

Here, the insulating films 132 and 134 are attached to the cathode lead 102 and the anode lead 104, respectively, so as to insulate about 80% of areas of the cathode lead 102 and the anode lead 104 that protrude outwardly, respectively. In addition, the insulating films 132 and 134 protrude from the battery case 110 at a length L2 corresponding to about 90% of a total length L1 of each of the leads that protrude outwardly.

Therefore, protruded surfaces of the cathode lead 102 and the anode lead 104 are mostly insulated by the insulating films 132 and 134, such that an electrically conductible area depending on a contact may be significantly restricted.

However, end portions of these leads 102 and 104 and some of surfaces adjacent thereto are not attached with the insulating films 132 and 134 but are exposed to the outside, such that electrical connection may be achieved through these restrictive portions.

Figure 6:
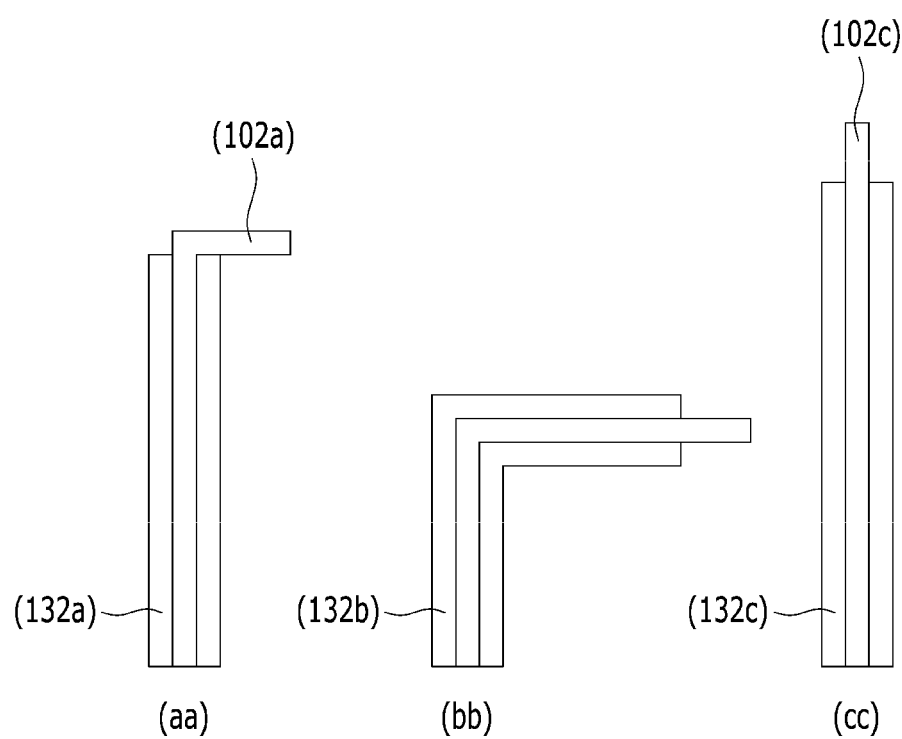
FIG. 6 is a schematic view illustrating modified examples of electrode leads.

In detail, as illustrated in FIG. 6, the electrode leads 102 and 104 are modified in a shape (aa) in which only the rest portion 102*a* to which the insulating film 132*a* is not attached is perpendicularly bent in a protrusion direction or a shape (bb) in which the electrode lead 102 is perpendicularly bent together with the insulating film 132*b*, and electrical connection of the electrode leads 102 and 104 may be achieved by welding, soldering, or mechanical fastening in this state. In order to prevent a contact, the electrode leads 102 and 104 may maintain a shape (cc) in which the rest portion 102*c* of the electrode leads 102 and 104 to which the insulating film 132*c* is not attached and the insulating film 132*c* form a straight line based on the cross section of the battery cell.

That is, in the battery cell 100 according to the present invention, the electrode leads 102 and 104 which are required to block an electrical contact or connected to configure an electrical connection are not separately distinguished, but the electrode leads 102 and 104 and the insulating films 132 and 134 are standardized in the same shape, such that the battery cell 100 has a structure capable of performing electrical conduction as needed while securing insulation in all of the electrode leads 102 and 104.

This provides a significant advantages in view of manufacturing processability as compared to a battery cell 100 in which shapes of insulating films 132 and 124 or electrode leads 102 and 104 are changed corresponding to electrode leads 102 and 104 requiring insulation and electrical conduction.

Figure 1:
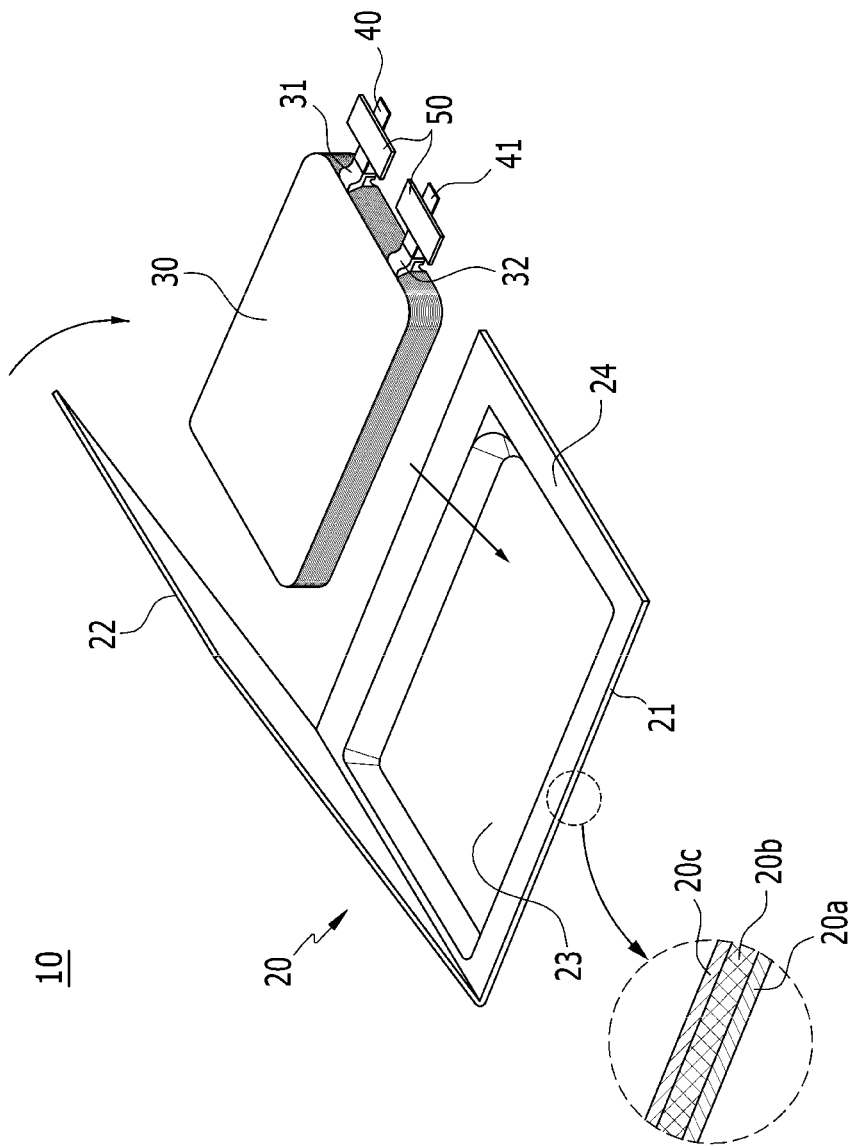
FIG. 1 is a schematic view of a battery cell according to the related art.
Figure 2:
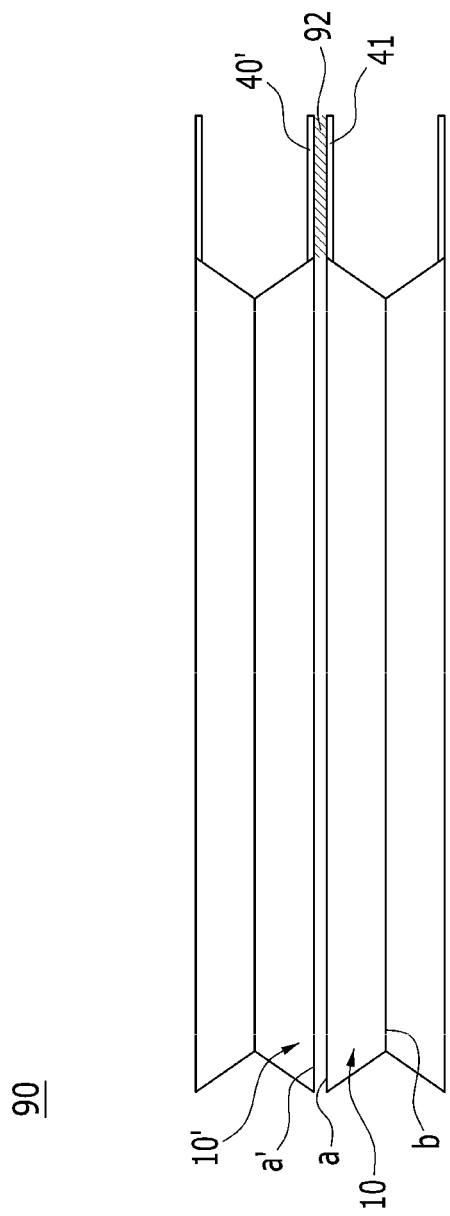
FIG. 2 is a schematic view of a battery pack according to the related art.

Particularly, as illustrated in FIGS. 3 to 5, first, the battery cell 100 has a shape in which the upper surface of the battery cell 100 and the electrode leads 102 and 104 form a straight line based on the cross section of the battery cell 100, and second, the battery cell 100 has a structure in which the electrode leads 102 and 104 protrude in parallel from the same outer peripheral portion. When a plurality of battery cells described above are stacked, as in the battery pack illustrated in FIG. 2, even though the electrode leads 102 and 104 of different battery cells 100 should not come in contact with each other, a distance between the electrode leads 102 and 104 is significantly adjacent to each other, such that the electrode leads may easily come in contact with each other.

Therefore, according to the present invention, in the battery cell 100 having the above-mentioned structure, insulation performance of the electrode leads 102 and 104 may be stably secured based on a structure in which the insulating films 132 and 134 restrict electrically conductible portions of the electrode leads to significantly small portions thereof without a separate insulating material. At the same time, if necessary, it is possible to achieve electrical connection in a desired form by deforming the rest portions of the electrode leads 102 and 104 that are not restricted as illustrated in FIG. 6.

Particularly, effects of the battery cell according to the exemplary embodiment of the present invention are more clearly proven in a battery pack illustrated in the following FIG. 7.

Figure 7:
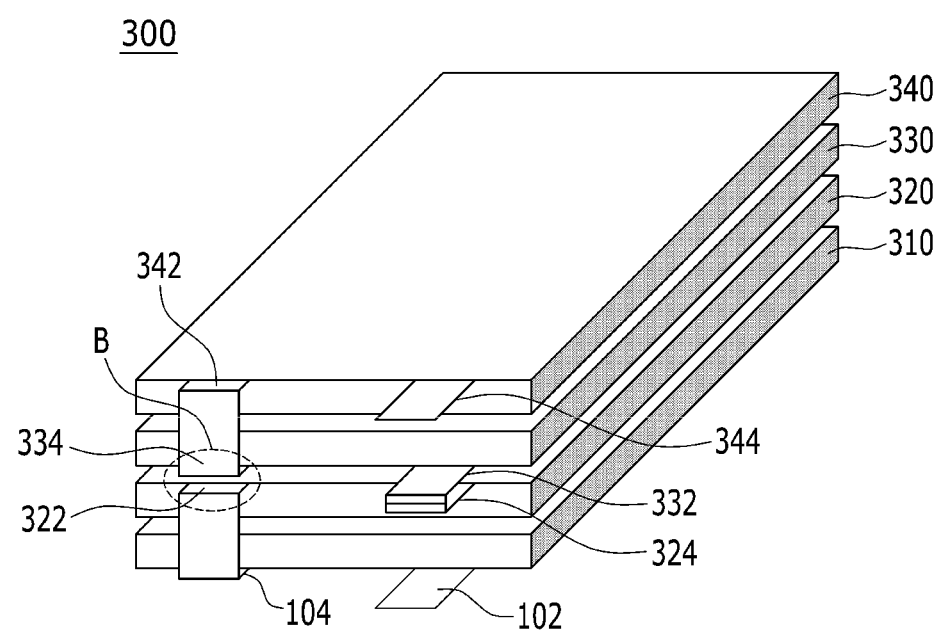
FIG. 7 is a schematic view of a battery pack according to an exemplary embodiment of the present invention.

Therefore, referring to FIG. 7 together with FIGS. 3 to 7, the battery pack includes a first battery cell 100 illustrated in FIGS. 3 to 5 and second to fourth battery cells 320 to 340 having the same shape as that of the first battery cell 100.

In the battery pack, all of the first to fourth battery cells 100, 320, 330, and 340 are connected in series to each other in a state in which the first to fourth battery cells 100, 320, 330, and 340 are sequentially stacked upwardly based on the ground.

In detail, the second battery cell 320 is stacked on a lower surface of the first battery cell 100 in a state in which electrode leads 102, 104, 322, and 324 of the first and second battery cells 100 and 320 are positioned in parallel with each other in a vertical direction.

Unlike this, the third battery cell 330 is stacked on an upper surface of the second battery cell 320 in a state in which electrode leads 322, 324, 332, and 334 of the second and third battery cells 320 and 330 are positioned in parallel with each other in the vertical direction.

Further, the fourth battery cell 340 is stacked on a lower surface of the third battery cell 330 in a state in which electrode leads 332, 334, 342, and 344 of the third and fourth battery cells 330 and 340 are positioned in parallel with each other in the vertical direction.

The reason why facing surfaces of the battery cells 100, 320, 330, and 340 are alternately arranged as described above is that all of the battery cells 100, 320, 330, and 340 having the same shape are connected in series to each other by disposing the electrode leads to opposite polarities.

Describing an electrical connection structure thereof, the cathode lead 102 of the first battery cell 100 maintains a shape in which the cathode lead 102 protrudes outwardly, and the anode lead 104 of the first battery cell 100 is electrically and physically bonded to the cathode lead 322 of the second battery cell 320. Therefore, these battery cells 100 and 320 are connected in series to each other.

The anode lead 324 of the second battery cell 320 is electrically and physically bonded to the cathode lead 332 of the third battery cell 330. Therefore, these battery cells 320 and 330 are connected in series to each other.

The anode lead 334 of the third battery cell 330 is electrically and physically bonded to the cathode lead 342 of the fourth battery cell 340, and the anode lead 344 of the fourth battery cell 340 maintains a shape in which the anode lead 344 protrudes outwardly. Therefore, all of the battery cells 100, 320, 330, and 340 are connected in series to each other.

However, in this structure, the second and third battery cells 320 and 330 are stacked in a shape in which the upper surfaces thereof face each other for serial connection between the electrode leads 322, 324, 332, and 334, and thus, the electrode leads 322, 324, 332, and 334 positioned in parallel with each other in the vertical direction are significantly adjacent to each other to thereby easily come in contact with each other.

Adjacency as described above does not cause problems in the anode lead 324 of the second battery cell 320 and the cathode lead 332 of the third battery cell 330, but when the cathode lead 322 of the second battery cell 320 and the anode lead 334 of the third battery cell 330 come in contact with each other to thereby be electrically conducted, a short-circuit may occur in the battery pack 300.

Therefore, according to the present invention, since the rest portions of the electrode leads except for significantly small portions thereof for electrical connection are completely insulated by the insulating films (132 and 134 of FIGS. 3 to 5), even though these electrode leads come in contact with each other, a short-circuit does not occur.

In addition, insulation performance may be basically secured due to the above-mentioned structure, and the battery cells may be stably connected to each other through modified structures of the electrode leads illustrated in FIG. 6.

In other words, even though the battery pack 300 according to the present invention is standardized so that structure of the insulating films 132 and 134 are not locally applied to some electrode leads 322 and 334 of which insulation performance needs to be secured, but are equally applied to all of the electrode leads, an electrical connection structure may also be configured in a desired form through portions of the electrode leads that are not insulated by the insulating films 132 and 134, such that the battery pack 300 may have excellent manufacturing processability as compared to a battery pack in which in consideration of only some of the electrode leads, a shape of the electrode lead or an electrical connection structure is changed or an insulating material is added.

FIG. 7 illustrates a single example of a structure of the battery pack according to the present invention, and the structure of the battery pack is not limited to the number of battery cells, a stacking structure of the battery cells, and a connection structure between electrode leads illustrated in FIG. 7.

Figure 8:
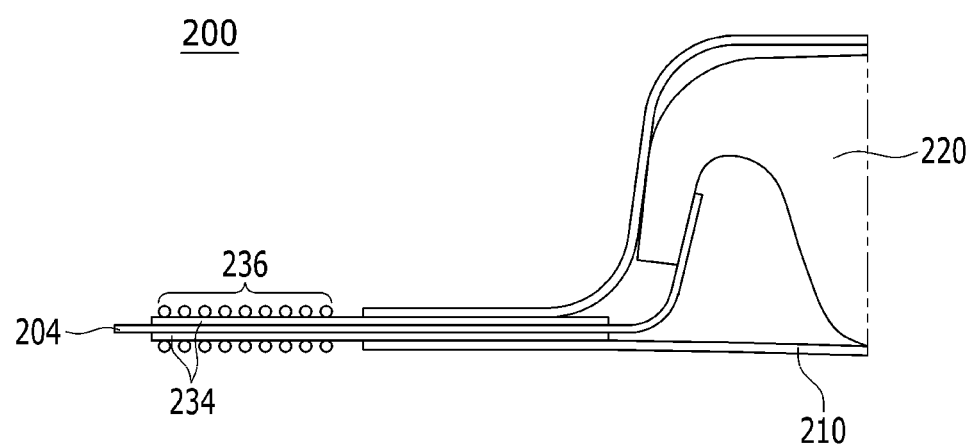
FIG. 8 is a schematic view of a battery cell according to another exemplary embodiment of the present invention.

Meanwhile, FIG. 8 is a schematic view of a battery cell according to another exemplary embodiment of the present invention.

Referring to FIG. 8, a battery cell 200 has the same structure as the structure illustrated in FIGS. 3 to 5 except that an outer surface of an insulating film 234 has an embossing structure 236.

This embossing structure 236, which is a structure in which a plurality of protrusions are formed integrally with a polymer resin layer forming an outer layer of the insulating film 234, serves to maintain an interval between an electrode lead 204 and an external object by a size of the protrusions when the protrusions come in contact with the external object.

That is, the battery cell 200 has a structure capable of more stably preventing undesired contact or electrical conduction of the electrode lead 204.

Those skilled in the art will appreciate that various applications and modifications are possible based on this description, without departing from the scope and spirit of the invention as disclosed in the accompanying claims.

INDUSTRIAL APPLICABILITY

As described above, the battery cell according to the present invention is standardized so as to secure insulation performance required in only some of electrode leads while having high insulation reliability based on the structure in which the insulating material is attached to the rest portions of the electrode leads exposed to the outside so that only significantly restrictive surfaces thereof are exposed, even without changing the shape of the battery cell and performing additional processes, such that the battery cell is significantly advantageous in view of manufacturing processability.

Further, the battery pack according to the present invention has a structure in which the insulating film significantly restricts contact electrical conduction of the electrode leads. Since the insulating film naturally blocks electrical conduction between electrode leads which should not come in contact with each other for configuring a circuit among the electrode leads that are essentially adjacent to each other because the battery cells are stacked so that upper surfaces thereof face each other, but the insulating film does not completely block contact electrical conduction of the electrode leads, the battery pack is configured so that an electrical connection structure may be achieved in a desired form through portions of the electrode leads in which electrical conduction may occur.

The invention claimed is:

1. A battery cell comprising:
a battery case made of a laminate sheet and having outer peripheral portions that are sealed by thermal bonding:
an electrode assembly mounted together with an electrolyte in the battery case;
electrode leads of the electrode assembly, the electrode leads protruding outward from the battery case; and
an insulating member respectively attached to each electrode lead in an area of at least 60% of a total area of each electrode lead that protrudes outwardly from the battery case, the insulating member having a covered portion that is covered by the battery case and an exposed portion that is outside of the battery case,
wherein the insulating member includes an embossing structure on a surface of the exposed portion, the embossing structure including a plurality of protrusions integrated with insulating member, and wherein the plurality of protrusions are spaced apart at regular intervals in a direction protruding outward from the battery case.

2. The battery cell of claim 1, wherein:
the battery case includes a case body in which an accommodation part is formed to accommodate the electrode assembly therein and a flat plate cover extended from one end portion of the case body or made of a member independent from the case body,
the flat plate cover forming an upper surface of the battery cell and the electrode leads protruding outwardly from the battery case in a shape in which the electrode leads and the flat plate cover form a straight line based on a cross section of the battery cell.

3. The battery cell of claim 1, wherein:
the insulating member is an insulating film attached to both surfaces of each electrode lead.

4. The battery cell of claim 3, wherein:
the insulating film protrudes outwardly from the battery case together with each electrode lead in a structure in which the insulating film partially encloses a surface of each electrode lead.

5. The battery cell of claim 4, wherein:
the insulating film protrudes from the battery case at a length corresponding to 60 to 90% of the total length of each electrode lead that protrudes outwardly.

6. The battery cell of claim 5, wherein:
a rest portion of the insulating film except for a portion of the insulating film protruding together with each electrode lead is thermally bonded to a contact surface of the battery case.

7. The battery cell of claim 3, wherein:
the insulating film includes at least one polymer resin layer and an adhesive layer formed on one surface of the resin layer.

8. The battery cell of claim 7, wherein:
the embossing structure is formed on the other surface of the polymer resin layer on which the adhesive layer is not formed.

9. The battery cell of claim 1, wherein:
the plurality of protrusions maintain an interval between each electrode lead and an external object when coming in contact with the external object.

10. The battery cell of claim 4, wherein:
each electrode lead is electrically connected to the outside through a rest portion of each electrode lead to which the insulating film is not attached.

11. The battery cell of claim 10, wherein:
the battery cell includes at least one shape selected from,
(a) a shape in which only the rest portion of each electrode lead to which the insulating film is not attached is perpendicularly bent in a protrusion direction of each electrode lead,
(b) a shape in which each electrode lead is perpendicularly bent together with the insulating film, and
(c) a shape in which the rest portion of each electrode lead to which the insulating film is not attached and the insulating film form a straight line based on a cross section of the battery cell.

12. The battery cell of claim 1, wherein:
the battery cell has:
a structure in which a pair of the electrode leads protrude in parallel with each other from the same outer peripheral portion of the battery case; or
a structure in which the pair of the electrode leads protrude from outer peripheral portions of the battery case opposing each other, respectively.

13. A battery pack including the battery cell of claim 1,
wherein n battery cells, n being greater or equal to 2 (n≥2), are connected at least one of in series and in parallel to each other,
wherein the battery cells are stacked upwardly based on a ground in a state in which electrode leads of battery cells different from each other are positioned in parallel with each other in a vertical direction, and
among then battery cells, at least one pair of the battery cells are stacked so that upper surfaces thereof face each other, and among the electrode leads of the battery cells stacked so that the upper surfaces thereof face each other, in electrode leads that are not connected to each other, an insulation state is maintained by insulating films attached to the electrode leads that are not connected, respectively.

14. A device comprising at least one battery pack of claim 13.

* * * * *